United States Patent [19]

Smith et al.

[11] Patent Number: 4,643,955

[45] Date of Patent: Feb. 17, 1987

[54] MOLTEN CARBONATE FUEL CELL REDUCTION OF NICKEL DEPOSITS

[75] Inventors: James L. Smith, Lemont; Stanley A. Zwick, Darien, both of Ill.

[73] Assignee: The United States of America as represented by the Department of Energy, Washington, D.C.

[21] Appl. No.: 751,391

[22] Filed: Jun. 27, 1985

Related U.S. Application Data

[63] Continuation-in-part of Ser. No. 485,528, Apr. 15, 1983, abandoned.

[51] Int. Cl.[4] .................... H01M 2/00; H01M 8/14

[52] U.S. Cl. .................... 429/34; 429/16; 429/41; 429/45

[58] Field of Search .................... 429/16, 34, 41, 45

[56] References Cited

U.S. PATENT DOCUMENTS

| | | | |
|---|---|---|---|
| 3,160,527 | 12/1964 | Hess | 429/41 |
| 3,268,365 | 8/1966 | McQuade | 429/41 X |
| 3,481,788 | 12/1969 | Hamlen et al. | 429/41 |
| 3,505,120 | 4/1970 | Cole | 429/41 |
| 3,981,749 | 9/1976 | Fukuda et al. | 429/41 |
| 4,411,968 | 10/1983 | Reiser et al. | 429/41 |

*Primary Examiner*—Brian E. Hearn
*Assistant Examiner*—Stephen J. Kalafut
*Attorney, Agent, or Firm*—William Lohff; Hugh W. Glenn; Judson R. Hightower

[57] ABSTRACT

A molten carbonate fuel cell with anode and cathode electrodes and an electrolyte formed with two tile sections, one of the tile sections being adjacent the anode and limiting leakage of fuel gas into the electrolyte with the second tile section being adjacent the cathode and having pores sized to permit the presence of oxygen gas in the electrolyte thereby limiting the formation of metal deposits caused by the reduction of metal compositions migrating into the electrolyte from the cathode.

9 Claims, 2 Drawing Figures

MOLTEN CARBONATE FUEL CELL REDUCTION OF NICKEL DEPOSITS

CONTRACTUAL ORIGIN OF THE INVENTION

The U.S. Government has rights in this invention pursuant to Contract No. W-31-109-ENG-38 between the U.S. Department of Energy and The University of Chicago representing Argonne National Laboratory.

This is a continuation-in-part of U.S. application Ser. No. 485,528 filed Apr. 15, 1983 now abandoned.

BACKGROUND OF THE INVENTION

This invention relates to molten carbonate fuel cells and more particularly to fuel cells with cathodes based on transition metals. At the present stage of their development, molten carbonate fuel cells typically include porous anode and cathode electrodes with an electrolyte component which separates and provides an ion conducting path between the electrodes. Means are provided for directing a hydrogen-affording fuel gas to the anode and an oxidant gas to the cathode, together with appropriate housing members including means for expelling reaction products from the cell. The electrolyte component is composed of one or more alkali metal carbonates as the electrolyte which is molten at the operating temperature of 600°-700° C. and dispersed in a solid matrix or tile. In the operation of the cell, carbonate ions are catalytically formed at the cathode from carbon dioxide and oxygen. The ions travel through the electrolyte towards the anode. At the anode, hydrogen in the fuel gas reacts with the carbonate ions to form water and carbon dioxide while releasing electrons to the external circuit.

As illustrated in U.S. Pat. No. 3,481,788, special openings or enlarged pores may be provided in the tile for the removal of the water and carbon dioxide by venting these products away from the cell.

Frequently in these cells, the cathode is formed of a nickel based composition such as a lithiated nickel oxide which provides electronic conductivity in addition to the required catalyst activity. The anode may be formed of a porous nickel composition. In operation of the cell, the fuel and oxidant gases may be supplied at atmospheric pressure or at elevated pressures up to about 10 atmospheres. At the higher pressures, the cell potential is increased and the overall operating efficiency of the cell is improved.

One of the problems with molten carbonate fuel cells having nickel based cathodes is associated with the loss or migration of nickel into the electrolyte. Nickel ions migrate through the electrolyte and are reduced by hydrogen gas diffusing into the electrolyte from the anode region to form a metallic nickel deposit within the electrolyte structure. The transfer of the nickel from the cathode is associated with the reaction $NiO + CO_2 \rightarrow NiCO_3$. At elevated pressures, the reaction tends to form increased amounts of $NiCO_3$ for transfer to the electrolyte. Since nickel has been considered to be one of the more promising materials for fuel cells, this problem is of concern in this art and efforts have been made to reduce the importance of the problem.

Accordingly, one of the objects of this invention is a molten carbonate fuel cell with a reduced migration of metal ions and particularly nickel ions from the cathode into the electrolyte. A second object is a molten carbonate fuel cell with a reduction in conditions in the electrolyte for reducing metal ions and particularly nickel ions to elemental metal. Another object is a molten carbonate fuel cell with desirable performance at elevated pressures. These and other objects will become apparent from the following description.

SUMMARY OF THE INVENTION

Briefly, the invention involves a molten carbonate fuel cell having anode and cathode electrodes, means for supplying a hydrogen-affording fuel gas to the anode and an oxidant gas to the cathode, and a dual electrolyte component between the electrodes.

The dual electrolyte component includes a first tile member adjacent the anode that essentially has no open pores and a second tile member adjacent the cathode that is made gas permeable by incorporation of connected open pores. Both tile sections have porous matrices with small pores to contain the molten electrolyte. In the second section, larger interconnecting pores are provided for admitting small amounts of oxidant gas from the cathode into the second tile member. The oxidant gas provides an oxidizing environment within the second tile member so that metal ions are not reduced to elemental metal. Hydrogen gas diffusing from the anode region is oxidized to produce water. The second tile member is further characterized by an increased ionic resistance to provide a higher (more positive) potential at points in the second tile member compared to the potential in the same thickness of a conventional tile. Because the nickel ion is not reduced in the second tile section, the region in which deposition occurs is very near the anode and is therefore at a higher potential relative to the cathode than in a conventional cell. Since the concentration of metal ions diffusing across a tile decreases exponentially with the potential, the concentration of the metal in the electrolyte in the deposition region will be reduced compared to that in a conventional cell.

DETAILED DESCRIPTION OF THE PREFERRED EMBODIMENT

Figure 1:
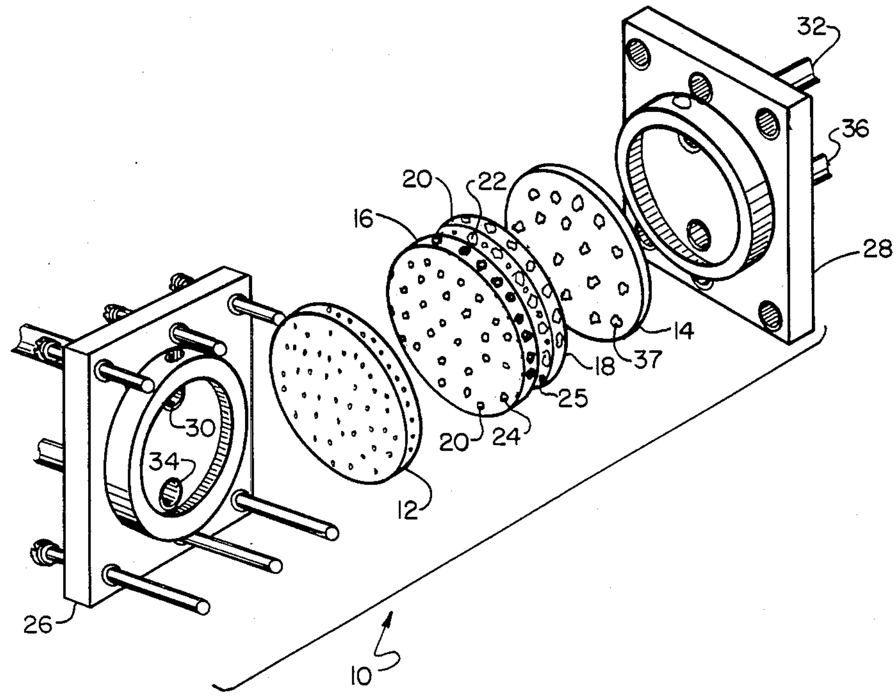
FIG. 1 is a cross-sectional view of a fuel cell as one embodiment of the invention.

Molten carbonate fuel cells of the invention include porous anode and cathode electrodes, means for directing a fuel gas to the anode and an oxidant gas to the cathode, and an electrolyte component with a first electrolyte filled tile section adjacent the anode and a second gas permeable tile section adjacent the cathode. The gas permeable tile permits oxidant to enter the tile from the cathode and provide an oxidizing atmosphere which prevents reduction of the metal ions in this second tile component. While the first tile is designed to minimize gas penetration, it is to be understood that minute amounts of hydrogen gas, particularly when introduced at elevated pressures, may enter the tile due to hydrogen solubility in the electrolyte, defects, or the like, and move towards the cathode. With oxidant gas being present within the second tile component, this hydrogen is oxidized to water vapor and removed. The metal ion will be reduced to metal in the first tile component but at a greatly reduced rate due to the lower concentration of metal present.

While the invention is particularly useful for nickel-based cathodes, it is to be understood that other transition metals which are used in cathode construction may characterize the cathode or be included as minor components in its structure. In general, these metals form carbonates that have some solubility in molten carbonate electrolytes and therefore are leachable from the cathode. Suitably, these metals are transition metals such as nickel, manganese, iron, tin or cobalt and preferably nickel. Since nickel is preferred and for convenience, the following description will identify the cathode as one based on nickel.

In the cell construction of particular importance, the anode may be formed of a porous transition metal composition and preferably nickel or other composition typical of molten carbonate fuel cells. The cathode is formed of a nickel based composition which is porous. Suitably, it may be a lithiated nickel oxide or similar composition. In general, the small pores are sized to contain and retain molten electrolyte while the larger pores are sized to remain unfilled. Typically, the cathode will be fabricated with large pores that remain unfilled with electrolyte, to provide oxygen and carbon dioxide access, and small pores that remain filled with electrolyte to provide catalytic surface and ionic conductivity. In general, the pore size for the smaller pores is less than about one micron and for the larger pores is about 5–20 microns. With tile pore sizes of about one micron for the small pores and 10 microns for the larger pores, the cathode may be formed of a material with large pores of about 10 microns in size. The first and second tile members are placed together and collectively form the matrix of the electrolyte component. The electrolyte is composed of one or more alkali metal carbonates such as $K_2CO_3$, $Li_2CO_3$ or mixtures of these carbonates.

The tile matrices may be constructed of various ceramic materials such as $LiAlO_2$, $SrTiO_3$, MgO or other stable electrically insulating material. As an aid in forming the desired dual pore size, the matrix may be constructed of a slurry of particles with a binder and fibers of the desired size or sizes. During sintering or other heat treatment, pores are formed in the tile by oxidation or decomposition of the fibers.

The electrolyte component is formed of first and second tile members, the first gas-impermeable tile having small pores of less then one micron for the molten carbonate electrolyte. The second gas-permeable tile member has both small and large pores, the small pores being less than one micron for the electrolyte and the larger pores being about 5–20 microns for the oxidant gas. Although both are dual-pore, the second tile section differs from the cathode by the absence of the catalytic metal and current collector and by the material of fabrication in the tile section being made of an inert nonconducting material (e.g., $LiAlO_2$).

With the guidelines of materials of construction, pore size and thickness provided herein, the tile members may be constructed using techniques well known in this art. Techniques used for conventional tiles may be used to construct the first tile member. These include tape casting and curtain coating. Techniques used to provide dual porosity for cathodes may be used to construct the second tile member. One technique to form the desired dual pore size in the second tile member is to make a slurry of particles with a binder and fibers of the desired size or sizes. General percentages are 40–60%, 30–50% and 10–30% by volume for the particles, binders and fibers. Suitable particle (e.g., $LiAlO_2$, $SrTiO_3$, MgO) sizes would be less than one micron. Suitable binders are polyvinyl-alcohol, or binders such as marketed by Claddan Technology, Inc. of San Marcos, California and with suitable fibers being nylon, cotton and/or similar organics that can be oxidized or decomposed below cell operating temperature sized in general about 5–20 microns so that the resultant pores extend across the tile member. The first tile member may also be formed in an identical manner except with no pore formers. In this case, the particles would comprise 40–60% of the slurry volume with binder making up the remaining volume.

The use of a binder causes the particles to adhere together while the fibers form pores of the desired sizes. After the slurry is formed into the desired disk or other shape, the two electrolyte components are pressed together and heat is applied to burn off the binder and fibers and sinter the particles to form a tile member with the pores being formed by oxidation or decomposition of the fibers. Temperatures in the order of 900°–1300° C. may be used for the sintering step. The fibers and binder would normally be burned off at 400–°600° C., prior to bringing it to the sintering temperature.

The cell is formed from the electrodes and tile members in the arrangement illustrated in FIG. 1. When arranged in the housing, the tile members are in contact with the outer electrodes and the adjacent tile member. During assembly sufficient $LiCO_3/K_2CO_3$ electrolyte is included with the anode and melts during cell startup. The molten electrolyte fills the fine pores in the tile structure.

The two structures could also be assembled in the cell prior to burning off the binder and pore formers and without sintering. The cell temperature would be raised slowly to (on the order of 24 h to 500°–600° C.) to allow the gases evolved during burning of the binder and pore formers to escape.

Advantageously, the second gas-permeable tile member comprises the major thickness of the electrolyte component and preferably is about 70–90% of the total thickness. Representative thickness values for the anode, cathode and electrolyte component are 0.020, 0.015 and 0.030–0.050 inches, respectively.

The means for directing a fuel gas to the anode and an oxidant gas to the cathode may be appropriate housing members including entry tubes to direct each gas to the appropriate electrode. A second tube may also be provided adjacent the anode for the removal of the products.

For the second tile member, means are also provided for directing an oxidant gas such as oxygen to the larger pores and thereby to the interior of the tile. With an oxidant composed of excess oxygen, the same gas stream supplying oxidant to the cathode may also be used to supply oxygen gas to the gas permeable tile.

FIG. 1 provides an illustration of a representative fuel cell as one embodiment of the invention. In the illustration, the electrodes and electrolyte component are in the form of disks. However, it is to be understood that rectangular shapes and other forms may also be utilized. As illustrated, fuel cell 10 comprises a porous anode 12 and a porous cathode 14 separated by a dual electrolyte component which is formed of a first gas impervious tile 16 and a second gas permeable tile 18. In the arrangement, tile 16 is adjacent anode 12 while tile 18 is adjacent cathode 14. Each tile includes small pores for containing a molten carbonate electrolyte 20 which is molten at the operating temperatures of about 600°-700° C. and serves as a means of ion transfer between the cathode 14 and anode 12. In this illustration, the electrolyte is a eutectic of $K_2CO_3$ and $Li_2CO_3$. Tile 18 further includes an inter-connected pattern of larger pores 22 for introducing oxygen gas or another oxidizing environment to within the tile and therefore within the electrolyte component. Small pores 24 and 25 in tiles 16 and 18 provide chambers for containing the electrolytes. At either end of the fuel cell 10 are arranged housing members 26 and 28 together with tubes 30 and 32 for directing fuel gas to the anode and an oxidant to the cathode. Tubes 34 and 36 are provided for removing products from the vicinity of the anode and waste gas ($N_2$, unused $O_2$, $CO_2$, etc.) from the vicinity of the cathode. Means are provided through the pores 37 of cathode 14 to introduce oxygen to the larger pores 22 of tile section 18 for introducing oxygen to within the electrolyte component. With an excess of oxygen in the oxidant gas which also contains carbon dioxide, oxygen or an/or oxidizing environment is thereby provided for the chambers formed by the pores in tile section 18.

Figure 2:
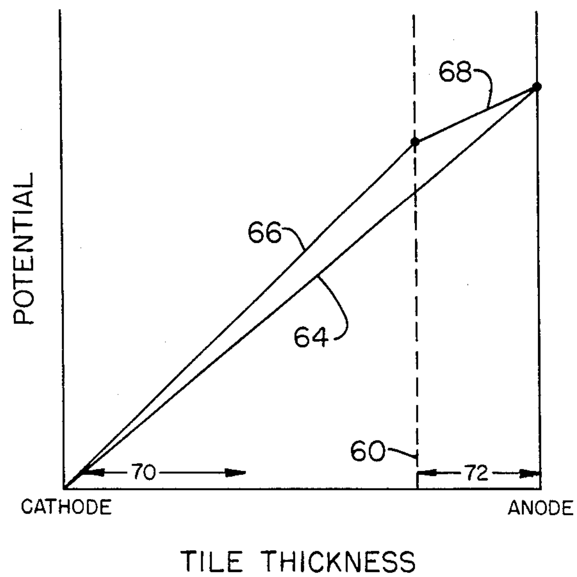
FIG. 2 is a graph of relative potential across the electrolyte in the cell of FIG. 1.

FIG. 2 provides an illustration of a representative potential across the cell of FIG. 1. Line 60 represents the interface between of the two tile sections with tile section 16 being represented to the right of line 60 and tile section 18 to the left. Line 64 represents the change in potential for the various values of potential across a uniform tile while lines 66 and 68 represent the potential across tiles 18 and 16 respectively. In a conventional cell, hydrogen from the anode diffuses more readily through the tile than oxygen from the cathode, so nickel ion reduction occurs near the cathode as illustrated by region 70. With the described invention, oxygen access is improved and the nickel deposition occurs near the anode as illustrated by region 72. Since the concentration of nickel ions into the tile is an exponentially decreasing function of the potential, the presence of or the concentration of nickel ion which would exist in the region of deposition for the inventive cell is much less than that in the conventional cell. The result is that the cell embodying the invention will have a lower concentration of nickel ion in the deposition zone and therefore the rate of deposit of elemental nickel will be greatly reduced.

By this invention, the inventors have provided a useful fuel cell and particularly a useful molten carbonate fuel cell having a cathode utilizing a nickel-based material. The fuel cell further provides benefits when the molten carbonate fuel cell is utilized at elevated pressures extending to values in the order of about 10 atmospheres. By reduction in the migration of nickel and the formation of nickel deposits in the electrolyte component, the inventors have provided a fuel cell in which the loss of nickel from the cathode is reduced together with the formation of nickel deposits in the electrolyte component.

The embodiments of the invention in which an exclusive property or privilege is claimed are defined as follows:

1. A fuel cell comprising a porous anode, a transition metal-based porous cathode separated from the anode, means for directing a hydrogen-affording fuel gas to the anode and an oxidant including oxygen gas to the cathode, and an electrolyte component between the anode and cathode including an alkali metal carbonate as an electrolyte, a first gas-impervious tile member adjacent the anode and a second gas-permeable tile member adjacent the cathode, both tile members having small pores containing the carbonate electrolyte with the second tile member having an interior and including interconnecting larger pores extending into said interior, the larger pores being arranged for receiving oxygen gas and providing an oxidizing environment within the second tile, the second tile member having an ionic resistance per unit thickness greater than that of the first tile member.

2. The fuel cell of claim 1 wherein the second tile member is of a thickness greater than that of the first tile member.

3. The fuel cell of claim 2 wherein the relative thickness of the second tile member is about 70–90% of the total thickness of the first and second tile members, the small and larger pores being below about 1 micron and being 5–20 microns, respectively.

4. The fuel cell of claim 3 wherein the transition metal is nickel.

5. The fuel cell of claim 3 wherein the transition metal is manganese.

6. The fuel cell of claim 3 wherein the transition metal is iron.

7. The fuel cell of claim 4 wherein the electrolyte is composed of a mixture of $Li_2CO_3$ and $K_2CO_3$.

8. The fuel cell of claim 1 wherein the transition metal is nickel and the oxidant is directed to the cathode at an elevated pressure.

9. The fuel cell of claim 8 wherein the second tile member is of a thickness greater than that of the first tile member.

* * * * *